United States Patent [19]

Palfery et al.

[11] Patent Number: 4,612,697

[45] Date of Patent: Sep. 23, 1986

[54] AUTOMATED MACHINING SYSTEM HAVING A WORKPIECE TRANSFER APPARATUS

[75] Inventors: Kenneth J. Palfery, Toronto; Kenrick B. Maharaj, Brampton; John S. Malcom, Schomberg; Donald R. Puckering, Georgetown; Kee-Shong Wong, Brampton, all of Canada

[73] Assignee: McDonnell Douglas Corporation, Long Beach, Calif.

[21] Appl. No.: 681,794

[22] Filed: Dec. 14, 1984

[51] Int. Cl.⁴ ............................................ B23Q 3/157
[52] U.S. Cl. ...................................... 29/568; 29/563; 414/729
[58] Field of Search ................. 29/568, 563, 564, 561, 29/26 A; 414/749, 751, 783, 729, 744 A, 750; 408/71, 70; 409/219; 901/6, 41

[56] References Cited

U.S. PATENT DOCUMENTS

| | | | |
|---|---|---|---|
| 4,090,287 | 5/1978 | Selander | 29/568 |
| 4,359,815 | 11/1982 | Toyoda | 901/64 |
| 4,369,563 | 1/1983 | Williamson | 29/568 |
| 4,404,727 | 9/1983 | Zankl | 29/568 |
| 4,486,928 | 12/1984 | Tuckerell | 29/568 X |

Primary Examiner—William R. Briggs
Attorney, Agent, or Firm—Benjamin Hudson, Jr.; George W. Finch; Donald L. Royer

[57] ABSTRACT

There is provided by this invention an automated machine tool having a workpiece transfer apparatus that allows the machine tool to automatically load and unload a workpiece during machining. The automated machine tool has the capacity to select a workpiece from a stack of raw material, transfer the workpiece to a machining station, and select a new workpiece from the stack of raw material without human intervention.

2 Claims, 5 Drawing Figures 4,612,697

AUTOMATED MACHINING SYSTEM HAVING A WORKPIECE TRANSFER APPARATUS

CROSS-REFERENCE TO RELATED APPLICATIONS

This application is related to the co-pending U.S. application Ser. No. 681,802, now U.S. Pat. No. 4,571,814.

BACKGROUND OF THE INVENTION

1. Field of the Invention

This invention relates generally to automatic machine tools programmable to perform multiple machining functions on a workpiece, and more particularly, to automatic machine tools having workpiece transfer apparatus operable to unload a workpiece from a storage bin and transfer the workpiece to a machining station.

2. Description of the Prior Art

Automated machine tools are well-known in the art, and perform a variety of cutting functions such as milling, drilling, threading, tapping, etc. on a workpiece. These machines are normally provided with a tool carousel that has numerous cutting tools mounted thereon for performing the variety of functions of the machine. The tool holder is generally a rotatable tool spindle mounted in a drill head adjustably mounted on a vertical column or quill for vertical movement. The tool spindle is mounted for rotation relative to the quill and is moveable axially with respect to the drill head. Additionally, the workpiece is secured to a worktable that is moveable in a x-y horizontal plane for providing a variety of positions to perform the various cutting operations.

The machine operation is performed by the rotatable tool spindle rotatably mounted on the drill head and arranged to be shifted vertically with respect to the workpiece. Precision cutting is performed, such that an aperture center may be precisely located with respect to the axis of the rotatable tool spindle and the combined movement of the worktable in its horizontal plane of movement. During the machining operation, the spindle is rotated at a pre-selected cutting speed and is feed downwardly by the drill head on the quill at a predetermined feed rate. The cutting tool is removably mounted in a chuck which is supported by the lower end of the rotatable spindle, and forms a part thereof. Additionally, a tool changer is adapted to remove the used tool from the chuck at the end of a cutting operation and replace the used tool with a pre-selected new tool in an automatic manner that eliminates lost time associated with manual tool changing operations.

All of these functions are carried out in a rapid efficient manner in order to bring about the most efficient operation of the machine tool. The automatic control of the machine tool is provided by a numerical control system operated under the control of a punched tape or other memory device which regulates the table so as to locate the cutting center with respect to the axis of the tool, the automatic selection of the rotatable spindle speed, the spindle feed rate on the quill, and other machine functions.

Automatic loading features, are usually not provided in automatic machine tools. It is often feasible to clamp the workpiece in a fixture outside of the machine area and slide it on rails into machining position after clamping. Present workpiece transfer systems require manual intervention to load the workpiece on a transfer shuttle system before the workpiece can be transferred to a workstation for machining. It would be desirable if an automatic machine had the capability to select a workpiece from a stack of material, transfer the workpiece to a machining station, and finally select a new workpiece from the stack of material. Such a machine tool having a much greater degree of automation provides more efficiency than machining operations with manual intervention.

SUMMARY OF THE INVENTION

There is provided by this invention, a machine tool that performs a variety of machining functions on a workpiece that has the capability to select a workpiece from a stack of raw material, transfer the workpiece to a machining station, and select a new workpiece from the stack of raw material without human intervention.

BRIEF DESCRIPTION OF THE PREFERRED EMBODIMENT

Figure 1:
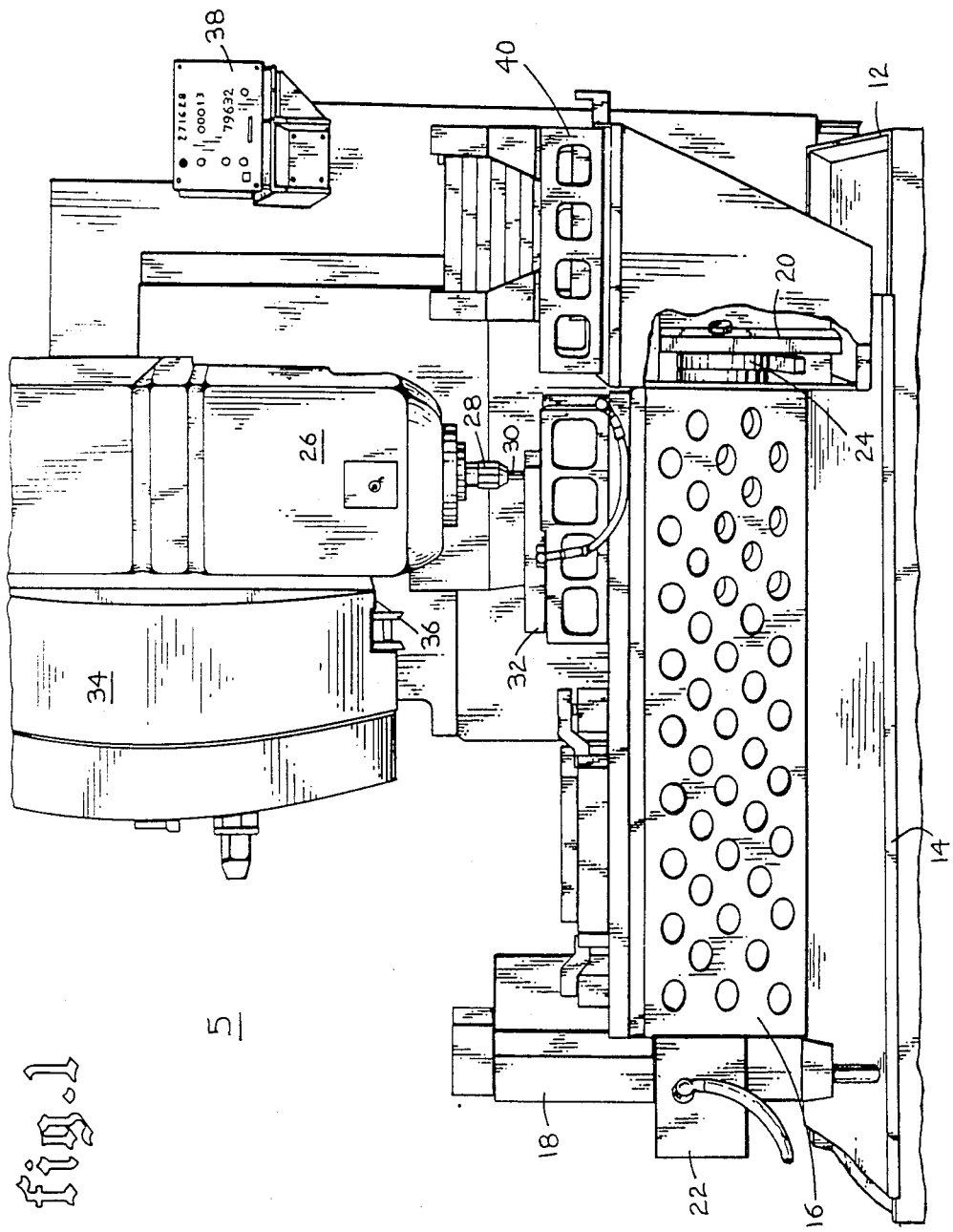
FIG. 1 is a perspective view of an automated machine tool incorporating the principles of this invention.

Referring to FIG. 1, there is shown an automated machining center 5. The automated machining center 5 is generally comprised of a frame 12, having mounted thereon a movable bed 14 that is disposed to move longitudinally and latitudinally in a horizontal plane. Mounted on the movable bed 14 is an elongated trunnion worktable 16 that is pivotally supported at each end by support structures 18 and 20 so that the worktable may be rotated about its horizontal axis by means of a drive motor 22. The trunnion worktable is extended to allow machining of large parts. A hydraulic brake 24 is mounted on a support 20 and actuated to apply friction braking to stop rotation of the trunnion workable 16 at a desired position. Rotation of the trunnion worktable 16 about its horizontal axis allows precision angular cutting to be performed on a workpiece with respect to the vertical axis of a cutting tool. A workpiece 32 may be machined by rotation of the trunnion worktable 16 simultaneously with x-y movements of the table in its horizontal plane. A drive head indicated generally at 26 is mounted to support frame 12 and is disposed to move in a vertical direction by means of a quill type shaft, not shown but well-known in the art. Supported at the end of the drive head 26, is a spindle 28 that holds a machine cutting tool 30. The drive head 26 is disposed to rotate the spindle 28 and the cutting tool 30 at a fixed speed rate to cut and machine a workpiece 32 that is mounted to the worktable 16. A tool changing carousel 34 is also supported on the support frame 12 in close proximity to the drill head 26 to store a multitude of different cutting tools that can be supported in the spindle 28 to perform different machining operations on the workpiece 32. When it is desired to change the cutting tool to perform a different machining operation, a tool changing arm 36 detaches the tool 30 from the spindle 28, returns the used tool to tool changing carousel 34, removes a new tool from the tool changing carousel 34, and inserts it into the rotatable spindle 28 to perform a new machining operation. Mounted on the trunnion worktable 16 is a material handling system generally indicated at 40 that unloads the workpieces from a stack of raw material in a manner hereinafter described.

The various automatic machining functions and precise alignment of the automated machine tool 5 are controlled by a programmable control unit 38. The programmable control unit 38 may be a numerical control control system with its program stored on a punch tape or other memory device. The programmable control unit 38, in addition to performing other functions that will be later described, controls the material handling system 40, the movement of the trunnion worktable 16 in a horizontal plane, the rotation of the trunnion worktable 16 about its horizontal axis, the speed rate of the rotatable spindle 28, and the automatic operation of the tool changing arm 36 to detach a used tool from the rotatable spindle 28 and exchange it with a tool stored in the tool changing carousel 34.

Figure 2:
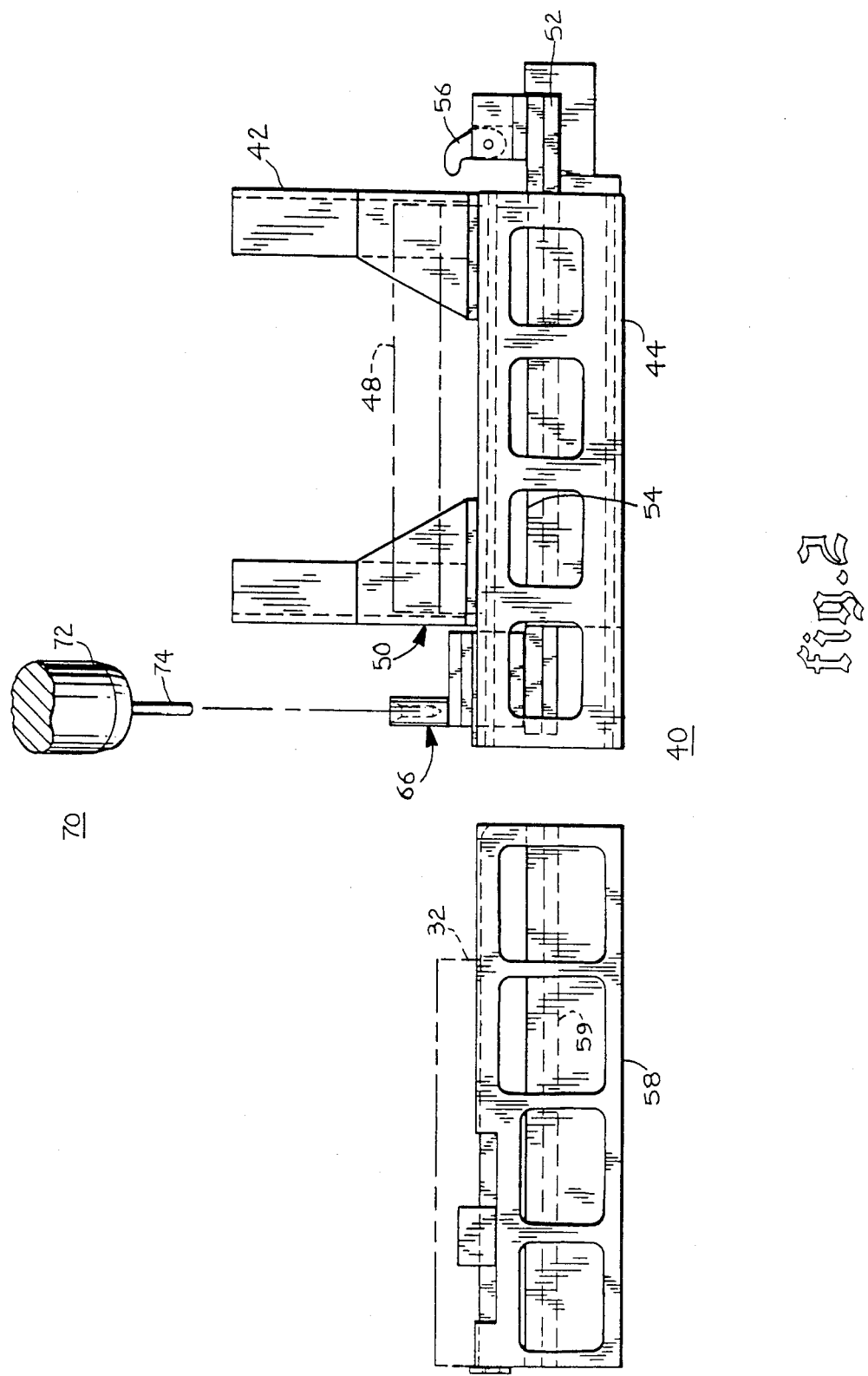
FIG. 2 is a front view of the material handling system shown in FIG. 1.
Figure 3:
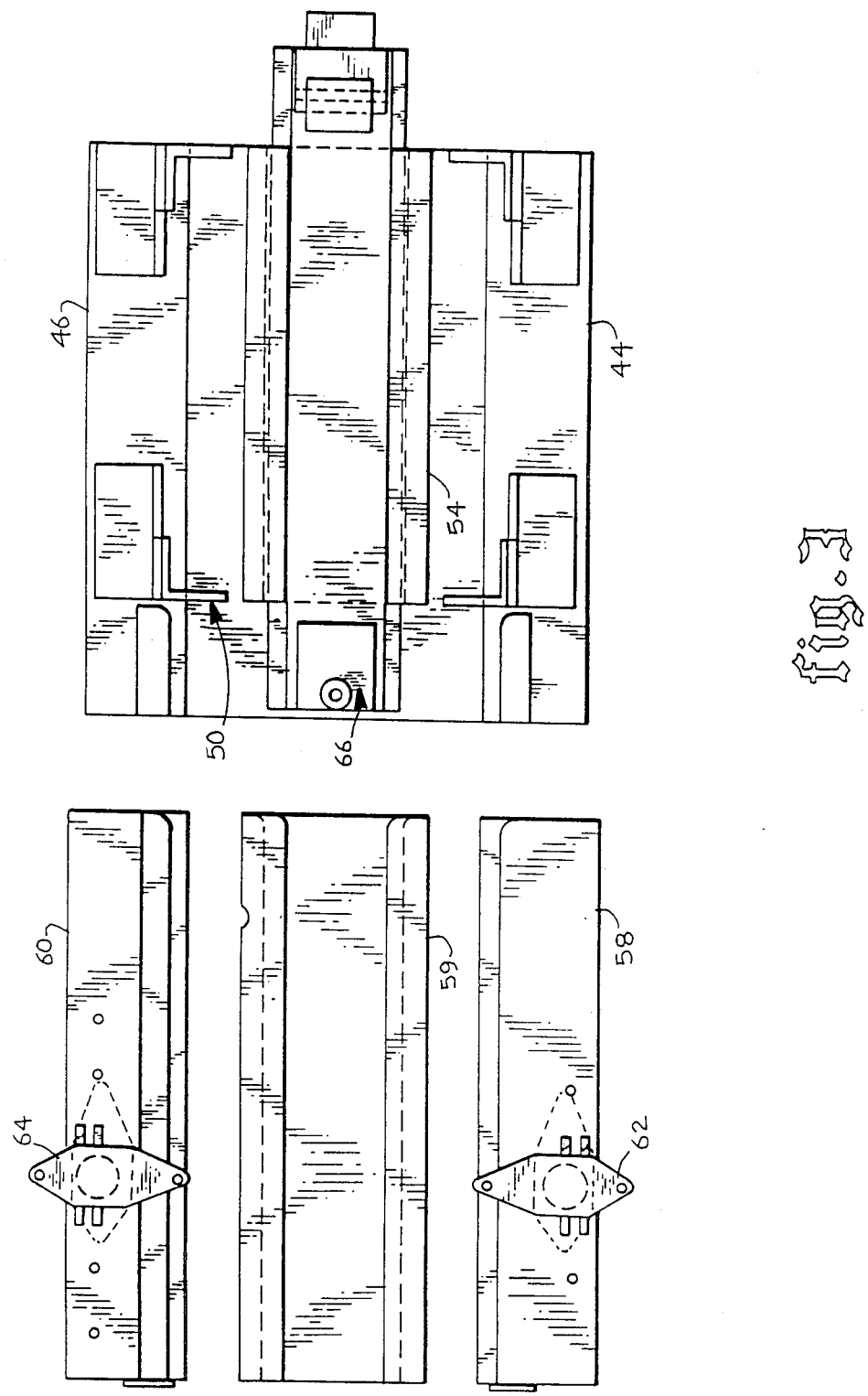
FIG. 3 is a top view of the material handling system shown in FIG. 2.

Referring to FIGS. 2 and 3, there is shown a material handling system generally indicated at 40 disposed to be mounted on the moveable worktable 16. The material handling system 40 is generally comprised of a storage bin 42 mounted on a pair of guide rails 44 and 46. The storage bin 42 is disposed to contain a stack of raw material 48 to be machined. A slotted opening 50 allows the workpiece 32 to be individually removed from the storage bin 42. A shuttle arm 52 is mounted generally between the pair of guide rails 44 and 46 beneath the storage bin 42 on a track 54 for movement thereon. An indexing lever 56 is pivotally mounted and spring biased on the shuttle arm 52. The shuttle arm 52 moves along the track 54 and is disposed to move the lowermost workpiece 32 from the stack of raw material 48 along the first pair of guide rails 44 and 46 onto a second pair of guide rails 58 and 60 by means of the track 59. Once in position on the second set of guide rails 58 and 60, the workpiece 32 is clamped in position by clamps 62 and 64. A latching pin 66 is connected to the shuttle arm 52 to facilitate movement of the shuttle arm 52 over the tracks 54 and 59. The latching pin 66 has an aperture therein designed to interconnect with an indexing tool 70 during a transfer operation in a manner hereinafter described. The indexing tool 70 can be stored in a tool changing carousel 34 and mounted in the rotatable spindle 28. The machining operation of the automated machine tool 5 begins with unloading the workpiece 32 from the stack of raw material 28 in the storage bin 42. This is accomplished by first retrieving the indexing tool 70 from the tool changing carousel 34 and inserting it into the rotatable spindle 28. The trunnion worktable 16, which is moveable in a horizontal plane is positioned such that the centerline of the aperture in the latching pin 66 is aligned with the axis of the indexing tool 70 that is mounted in the rotatable spindle 28. The indexing tool 70 has a tool head 72 designed to mount in the spindle 28 and an elongated shaft 74 connected to the tool head 72. Rotation of the spindle 28 is not necessary for the use of the indexing tool 70. The drive head 28 is then lowered vertically such that the elongated shaft 74 is inserted into the aperture of the latching pin 66. The trunnion worktable 16 is then moved in a straight line motion lengthwise such that the shuttle arm 52 is pulled along the track 54 and the indexing lever 56 pushes the workpiece 32 along the guide rails 44 and 46 from the storage bin 42 onto the second set of guide rails 58 and 60. On the second set of guide rails 58 and 60, hydraulic clamps 62 and 64 clamp the workpiece 32 into position. Once clamped into position, the machining center 5 can perform the necessary machine functions.

Figure 5:
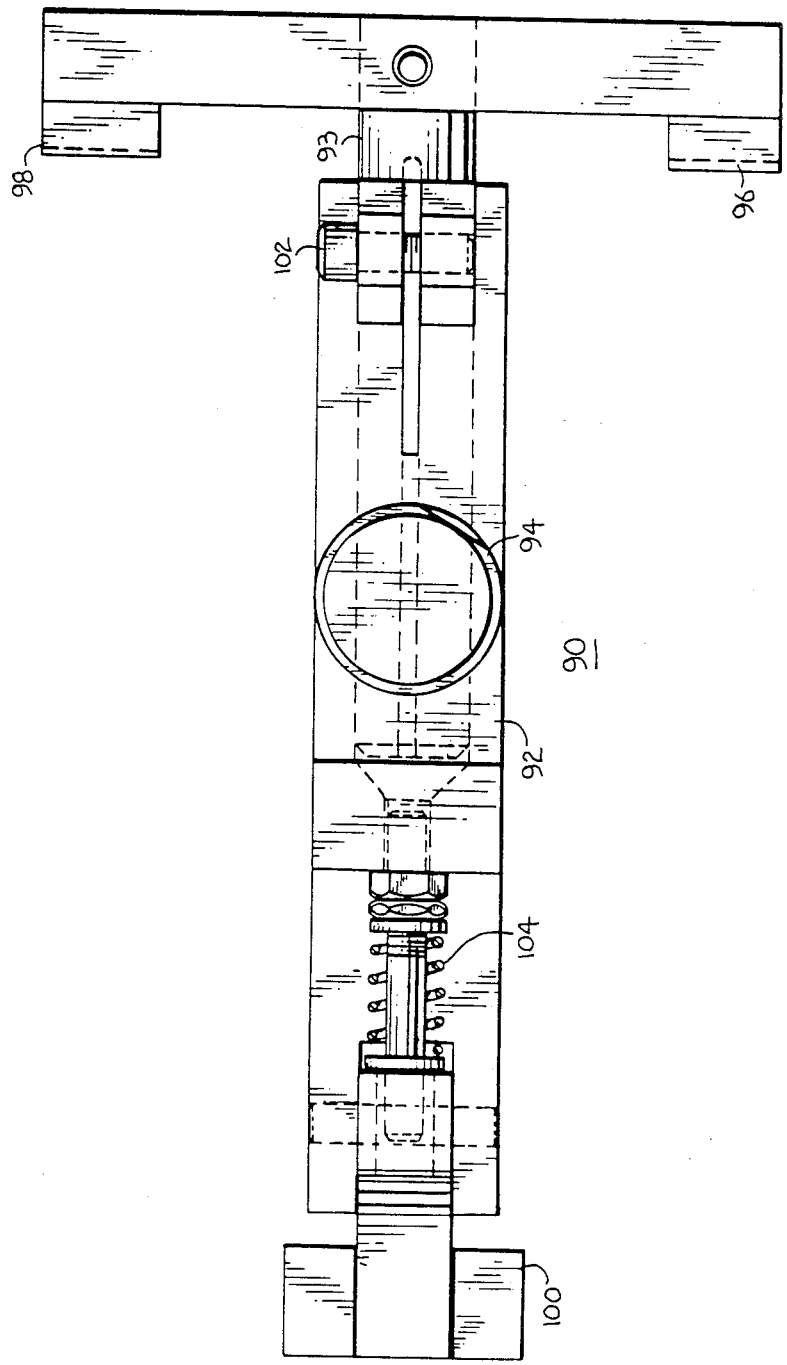
FIG. 5 is a top view of the workpiece pickup attachment shown in FIG. 4.

After the workpiece 32 has been machined, the workpiece is removed from the machining station by a workpiece pickup attachment 90 shown in FIGS. 5, 6 and 7. Upon command of the programmable control unit 38, the tool changing arm 36 retrieves the workpiece pickup attachment 90 and inserts it into the rotatable spindle 28. The workpiece pickup attachment 90 is generally a three point pickup assembly having three separated gripper pads, one of which is spring loaded to provide the necessary gripping force to lift the material while the other two are fixed to accommodate varying sizes of material to be handled.

Figure 4:
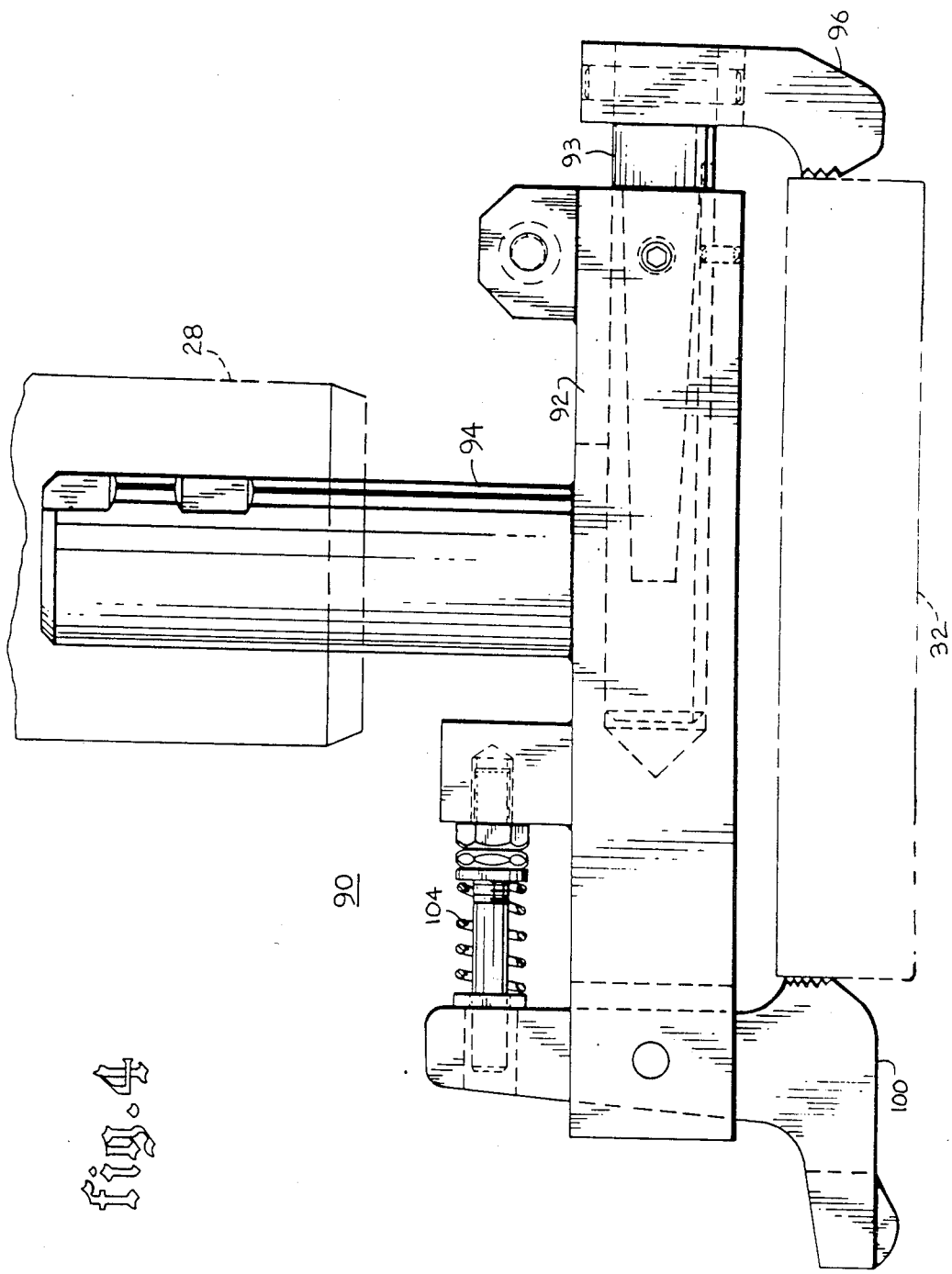
FIG. 4 is a front view of the workpiece pickup attachment incorporating the principles of this invention.

Referring to FIGS. 4 and 5, the workpiece pickup attachment 90 is comprised of a generally hollow support member 92 having connected thereto a chuck 94 that is disposed to be connected to the rotatable spindle 28 for support thereby. Inserted in the support member 92 is a telescoping member 93 that has attached at one end a bracket having two gripper pads 96 and 98. Also connected to the support 92 is a gripper pad 100 pivotally connected and spring biased. A locking nut 102 is provided to lock the telescoping member 94 to restrict movement within the support member 92 to set the distance between the gripper pads 96, 98 and 100 for accommodating various sizes of stock material. A spring 104 biases the gripper pad 100 to maintain pressure on stock material in combination with the gripper pads 96 and 98. Once the workpiece pickup attachment 90 is mounted in the rotatable spindle 28, the drill head 90 is then lowered until the gripper pads make contact with the workpiece such that the gripper pad 100 is pivoted against the biasing of the spring 104 and the workpiece 32 is contained between the gripper pads 96, 98 and 100 supported by the pressure applied by the spring 104. The drill head 26 then raises vertically, carrying the workpiece 32 within the workpiece pickup attachment 90 and the trunnion worktable 16 moves in its horizontal plane to a pre-programmed position until the workpiece is located just above the next machining station. When the predetermined position is reached, the drill head 26 then lowers the workpiece to the next machining station.

Once the workpiece has been removed, the trunnion worktable 16 is again moved in a straight-line motion lengthwise but the the opposite direction such that the indexing tool 70 returns the shuttle arm to the storage bin 42. The indexing lever 56 is forced to pivot clockwise under the next lowermost workpiece in the storage bin 42 against its spring biasing until it clears the storage bin 42. The spring biasing then pivots the indexing lever 56 counter clockwise into position to drive the next workpiece to the machining station. This operation is repeated for each workpiece in the storage bin 42.

Although there has been illustrated and described a specific structure, it is clearly understood that the same were merely for purposes of illustration and that changes and modifications may be readily made therein by those skilled in the art without departing from the spirit and cope of this invention.

What we claim is:
1. An automated machine tool, comprising;
   (a) A frame;

(b) A movable worktable means connected to the frame for supporting a workpiece and movable longitudinally and latitudinally to position the workpiece at a desired point in a horizontal plane;

(c) A rotatable spindle means mounted on a drive head and vertically movable relative to the frame for supporting and rotating a cutting tool at a predetermined speed rate to machine the workpiece;

(d) A tool changing means connected to the frame for storing tools and exchanging the tool supported in the rotatable spindle means with one of a multitude of different tools stored therein;

(e) A material handling means having a workpiece pick-up means adapted to be supported in the rotatable spindle means and stored in the tool-changing means for picking up the workpiece and allowing the transport of the workpiece to a second machining station on a movable worktable means; and (f) A programmable control means disposed to control the movable worktable means, the rotatable spindle means, the tool changing means, and the material handling means for automatically loading the workpiece onto the worktable, machining the workpiece, and selection of a new workpiece for machining.

2. An automated machine tool as recited in claim 1 wherein the material handling system is comprised of:

(a) A set fo guide rails mounted on the movable worktable means for transporting a workpiece;

(b) A storage means for storing a stack of material to be machined, mounted generally on the set of guide rails;

(c) A track mounted shuttle arm having a latching pin with an aperture therein connected to the shuttle arm mounted on the set of guide rails generally beneath the storage means to actuate a workpiece from the storage means and drive the workpiece over the set of guide rails;

(d) An indexing tool having an elongated shaft and configured to be stored in the tool changing means and supported by the rotatable spindle means, whereby the elongated shaft of the indexing tool is inserted into the aperture of the latching pin to drive the track-mounted shuttle arm in response to the movement of the movable worktable means; and (e) An adjustable three-point mechanical hand, spring biased to provide gripping force and configured to be stored in a tool-changing means for use by the rotatable spindle means in response to the programmable control means for picking up the workpiece from the guide rails and transferring the workpiece to another machining station.

* * * * *

UNITED STATES PATENT OFFICE
CERTIFICATE OF CORRECTION

PATENT NO. : 4,612,697
DATED : 23 September 1986
INVENTOR(S) : Kenneth J. Palfery, et al.

It is certified that error appears in the above-identified patent and that said Letters Patent are hereby corrected as shown below:

Patent front page, in the Inventors, line 3, [Malcom] should be Malcolm.

In the Abstract, line 5, the word [capacity] should be capability.

In column 6, line 1, the word [fo] should be of.

Signed and Sealed this

Seventh Day of April, 1987

Attest:

DONALD J. QUIGG

Attesting Officer

Commissioner of Patents and Trademarks